(12) United States Patent
Kim et al.

(10) Patent No.: US 11,466,729 B2
(45) Date of Patent: Oct. 11, 2022

(54) MOTOR ASSEMBLY AND METHOD FOR MANUFACTURING THE SAME

(71) Applicant: LG Electronics Inc., Seoul (KR)

(72) Inventors: Sunggi Kim, Seoul (KR); Byungjik Kim, Seoul (KR); Eunji Hwang, Seoul (KR); Jisu Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 283 days.

(21) Appl. No.: 16/821,513

(22) Filed: Mar. 17, 2020

(65) Prior Publication Data

US 2020/0392989 A1  Dec. 17, 2020

(30) Foreign Application Priority Data

Jun. 14, 2019  (KR) .......................... 10-2019-0070642

(51) Int. Cl.
*F16C 19/56* (2006.01)
*H02K 5/16* (2006.01)
*H02K 7/14* (2006.01)

(52) U.S. Cl.
CPC ............. *F16C 19/56* (2013.01); *H02K 5/161* (2013.01); *F16C 2240/70* (2013.01); *H02K 7/14* (2013.01)

(58) Field of Classification Search
CPC ...... F04D 29/49; F04D 29/59; F05D 2240/54; H02K 5/161; H02K 5/1732; H02K 9/06; F16C 19/56; F16C 2240/70; F16C 2360/46

See application file for complete search history.

(56) References Cited

U.S. PATENT DOCUMENTS

| | | | |
|---|---|---|---|
| 4,247,246 A * | 1/1981 | Abe ...................... | F04D 29/051 |
| | | | 415/55.1 |
| 5,382,858 A | 1/1995 | Sugiyama | |
| 5,555,956 A * | 9/1996 | Voss ...................... | F04D 29/584 |
| | | | 415/110 |

(Continued)

FOREIGN PATENT DOCUMENTS

| | | | |
|---|---|---|---|
| AU | 2018354513 | 2/2020 | |
| DE | 102008028607 A1 * | 12/2009 | .............. F16C 25/08 |

(Continued)

OTHER PUBLICATIONS

DE102014001922desc_machine_translation.*

(Continued)

*Primary Examiner* — Phillip A Johnson
(74) *Attorney, Agent, or Firm* — Fish & Richardson P.C.

(57) ABSTRACT

A motor assembly includes a rotation shaft, an impeller installed at one side of the rotation shaft, a rotor mounted at the other side of the rotation shaft to be spaced apart from the impeller along an axial direction of the rotation shaft, a stator surrounding an outer face of the rotor such that the stator is spaced apart from the rotor along a radial direction of the rotation shaft, a first bearing installed at the one side of the rotation shaft between the impeller and the rotor, and a second bearing installed at the other side of the rotation shaft, opposite to the first bearing with respect to the rotor, and disposed to be axially closer to the other end of the rotation shaft than the rotor. An outer diameter of the first bearing is larger than an outer diameter of the second bearing.

19 Claims, 13 Drawing Sheets

(56) References Cited

U.S. PATENT DOCUMENTS

| | | | | |
|---|---|---|---|---|
| 8,636,479 | B2 * | 1/2014 | Kenyon | F04D 29/602 417/423.5 |
| 2008/0304986 | A1 | 12/2008 | Kenyon et al. | |
| 2010/0059056 | A1 | 3/2010 | Sears et al. | |
| 2016/0312826 | A1 | 10/2016 | Kawashima et al. | |
| 2018/0076683 | A1 * | 3/2018 | Hwang | H02K 7/088 |
| 2018/0363669 | A1 | 12/2018 | Sullivan | |

FOREIGN PATENT DOCUMENTS

| | | | |
|---|---|---|---|
| DE | 102014001922 A1 * | 9/2014 | H02K 5/1732 |
| EP | 3376043 | 9/2018 | |
| EP | 3409173 | 12/2018 | |
| EP | 3456232 | 3/2019 | |
| JP | 2003088081 | 3/2003 | |
| KR | 1020090029439 | 3/2009 | |
| KR | 1020140022505 | 2/2014 | |
| KR | 101852111 | 4/2018 | |
| KR | 1020180105934 | 10/2018 | |
| KR | 101967550 | 4/2019 | |
| KR | 1020190045103 | 5/2019 | |
| TW | 201843911 | 12/2018 | |
| WO | WO2008051534 | 5/2008 | |
| WO | WO2019083238 | 5/2019 | |

OTHER PUBLICATIONS

TW Office Action in Taiwanese Appln. No. 109116749, dated May 17, 2021, 18 pages (with English translation).
Australian Office Action in Australian Application No. 2020203439, dated Nov. 9, 2020, 6 pages.
Extended European Search Report in European Application No. 20177285.2, dated Nov. 2, 2020, 8 pages.
Korean Office Action in Korean Application No. 10-2019-0070642, dated Oct. 19, 2020, 10 pages (with English translation).

* cited by examiner

MOTOR ASSEMBLY AND METHOD FOR MANUFACTURING THE SAME

CROSS-REFERENCE TO RELATED APPLICATION

This application claims the benefit of Korean Patent Application No. 10-2019-0070642, filed on Jun. 14, 2019, which is hereby incorporated by reference as when fully set forth herein.

BACKGROUND

Field

Embodiments of the present disclosure relate to a motor assembly and a method for manufacturing the same, and more particularly to, a motor assembly having a bearing for supporting a rotation shaft and a method for manufacturing the same.

Discussion of the Related Art

A motor may be installed in a household appliance such as a cleaner, a hair dryer, or the like to function as a driving source for generating a rotational force. The motor may be coupled to a fan, and in this case, the rotational force of the motor is transmitted to the fan to generate airflow based on rotation of the fan.

The cleaner or the hair dryer mentioned above as an example operates in a state of being lifted by a hand of a user. Thus, it is needless to describe additionally that manufacturing the cleaner or the hair dryer lighter weight and smaller volume is a core value of recent engineering, provided that a necessary function is improved or at least kept the same.

In manufacturing of general household appliances in addition to the cleaner and the hair dryer, weight lightening and miniaturization are required while improving or at least maintaining inherent functions thereof. This is to maximize a user convenience, which is an essential item to secure differentiation from competitive products in a fierce market.

As an example, because an inherent function of the cleaner is to suck dust, improving the cleaner is to improve a suction power thereof. In other words, in order to improve the function of the cleaner, it is necessary to improve an output of the motor which has an absolute influence on the suction power.

For example, the output of the motor may be improved by increasing a revolution per minute (RPM) of the motor. However, when the revolution per minute of the motor is set to be high, it is required to stably support a rotation shaft of the motor rotating at a high speed. In other words, a durability of a bearing supporting the rotation of the rotation shaft must also be strengthened, so that the output of the motor may be improved and a life of the cleaner may be extended.

A life of the bearing is determined by many factors, but a bearing size is one of the most important factors in the life of the bearing. For example, the larger the bearing size, the longer the life of the bearing. However, as the size of the bearing increases, sizes of other components of the motor accommodating the bearing therein also increase, which inevitably results in the opposite of the trends of the miniaturization and the weight lightening. On the contrary, when the bearing size is designed to be small for the miniaturization and the weight lightening, the life of the bearing is shortened. Thus, the rotation shaft of the motor may not be able to be stably supported for a long time.

In summary, the smaller the size of the bearing is, the better it is to realize the miniaturization and the weight lightening of the motor, but the larger the bearing size is, the better it is to secure the long life of the bearing. Therefore, in order to achieve the miniaturization and the weight lightening of the motor, and to secure the life of the bearing as long as possible, an appropriate compromise on the size of the bearing is required.

Conventionally, it was common to support both sides of the rotation shaft with two bearings to speed up the motor and maintain a life, a performance, and a reliability. In addition, it was common that the bearings respectively supporting the both sides of the rotation shaft have the same size. One of the two bearings is installed adjacent to an impeller (hereafter, referred to as being installed at one side of the rotation shaft), and the other is installed at a position farther from the impeller than a rotor (hereafter, referred to as being installed at the other side of the rotation shaft). In this connection, the bearing among the two bearings installed at the other side of the rotation shaft preferably has an outer diameter smaller than an inner diameter of a stator.

When the outer diameter of the bearing installed at the other side of the rotation shaft is smaller than the inner diameter of the stator, as disclosed in the prior art, a scheme of installing the two bearings and the rotor on the rotation shaft first, and then assembling the bearing installed at the other side of the rotation shaft to penetrate an inner face of the stator may not be able to be used.

Instead, when the outer diameter of the bearing installed at the other side of the rotation shaft is larger than the inner diameter of the stator, the bearing installed at the other side of the rotation shaft may only be installed at the other side of the rotation shaft after the rotation shaft passes the inner face of the stator, which inevitably leads to an increase in assembly costs.

As such, the size of the bearing is an important design consideration for the life of the bearing. In order to prevent the increase of the assembly costs and to pursue the miniaturization and the weight lightening of the motor, it is necessary to consider optimization of the bearing size.

SUMMARY

As described above, the prior art lacks awareness of the problem of the assembly costs, and only discloses the concept of supporting the both sides of the rotation shaft with the two bearings to stably support the rotation shaft. The prior art does not fully describe the problem that the above-mentioned trade-off point exists when attempting to secure the sufficient bearing life while pursuing the miniaturization and the weight lightening of the motor.

A purpose of embodiments of the present disclosure is to reflect a trend of miniaturization and weight lightening of a motor assembly installed in a home appliance.

Further, a purpose of embodiments of the present disclosure is to realize a bearing structure that may secure a sufficient life by improving reliability and durability in supporting a rotation shaft of a motor rotating at a high speed.

Further, a purpose of embodiments of the present disclosure is to provide a motor assembly and a method for manufacturing the same that may realize convenience and cost reduction during assembly.

Further, a purpose of embodiments of the present disclosure is to provide a motor assembly and a method for manufacturing the same that may simultaneously realize miniaturization and weight lightening of the motor assembly, improvement of reliability and durability of a bearing structure, and cost reduction during assembly.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In a motor assembly and a method for manufacturing the same according to embodiments of the present disclosure for solving the problems as described above, a rotation shaft is supported by two bearings having different outer diameters.

Specifically, a bearing having a relatively large outer diameter supports one side of the rotation shaft adjacent to an impeller in an axial direction and in a radial direction, and a bearing having a relatively small outer diameter supports the other side of the rotation shaft in the radial direction, thereby realizing a high speed of a motor, and at the same time, reflecting a trend of miniaturization and weight lightening of the motor assembly. Further, reliability and durability of a bearing structure may be secured, a life of the bearing structure may be sufficiently secured, and assembly costs of the motor assembly during assembly of the motor assembly may be reduced.

Particular embodiments described herein include a motor assembly including a housing, a rotation shaft, an impeller mounted on the rotation shaft, a rotor, a stator, a first bearing, and a second bearing. The rotor may be mounted on the rotation shaft and axially spaced apart from the impeller along a rotational axis of the rotation shaft. The stator may surround an outer face of the rotor and be radially spaced apart from the rotor. The first bearing may be mounted on the rotation shaft between the impeller and the rotor and configured to rotatably support the rotation shaft against the housing. The second bearing may be mounted on the rotation shaft opposite to the first bearing with respect to the rotor and configured to rotatably support the rotation shaft against the housing. An outer diameter of the first bearing may be larger than an outer diameter of the second bearing.

In some implementations, the system can optionally include one or more of the following features. The rotation shaft may have a first portion configured to mount the first bearing and a second portion configured to mount the second bearing. The first portion may have an outer diameter that is larger than an outer diameter of the second portion. The rotation shaft may include a first portion supported by the first bearing radially and axially relative to the rotational axis of the rotation shaft, and a second portion supported by the second bearing radially relative to the rotational axis of the rotation shaft. The housing may include a first bearing housing that receives the first bearing therein. The first bearing housing may include a first side support and a first longitudinal support. The first side support may define a first through hole through which the rotation shaft is received. The first side support may be configured to at least partially surround an outer circumferential surface of the first bearing and prevent a radial movement of the first bearing relative to the rotational axis of the rotation shaft. The first longitudinal support may be configured to at least partially cover an axial surface of the first bearing and prevent an axial movement of the first bearing towards the impeller. The first bearing may include a first inner ring, a first outer ring, and a first rolling member. The first inner ring may be fixed on an outer circumferential face of the rotation shaft. The first outer ring may be fixed to the first side support and the first longitudinal support of the first bearing housing. The first rolling member may be interposed between the first inner ring and the first outer ring and configured to movably support the first inner ring relative to the first outer ring. The rotation shaft may include an impeller coupling portion that mounts the impeller thereon, a first bearing coupling portion that mounts the first bearing thereon, a rotor coupling portion mounts the rotor thereon, and a second bearing coupling portion that mounts the second bearing thereon. An outer diameter of the first bearing coupling portion may be smaller than an outer diameter of the rotor coupling portion. The rotation shaft may include a first radial contact face that radially extends and that contacts with the first bearing. The first inner ring of the first bearing may be fixed to an outer circumferential face of the first bearing coupling portion and the first contact face of the rotation shaft such that the first inner ring rotates together with the rotation shaft when the rotation shaft rotates. The rotation shaft may include a first step configured to axially seat the first bearing thereon and prevent an axial movement of the first bearing toward the rotor. The housing may include a motor housing having an inner circumferential face that mounts the stator thereon. The motor housing may include a second side support and a detachment preventing portion. The second side support may define a second through hole through which the rotation shaft is received. The second side support may be configured to at least partially surround the second bearing and prevent a radial movement of the second bearing relative to the rotational axis of the rotation shaft. The detachment preventing portion may be configured to at least partially cover an axial surface of the second bearing. The detachment preventing portion may be axially spaced apart from the second bearing. The second bearing may include a second inner ring fixed on the outer circumferential face of the rotation shaft, a second outer ring fixed to the second side support of the second bearing housing, and a second rolling member interposed between the second inner ring and the second outer ring and configured to movably support the second inner ring with respect to the second outer ring. An outer diameter of the second bearing coupling portion may be smaller than an outer diameter of the rotor coupling portion. The rotation shaft may include a second radial contact face that radially extends and contacts with the second bearing. The rotation shaft may include a second step configured to axially seat the second bearing thereon and prevent an axial movement of the second bearing toward the impeller. The outer diameter of the first bearing may be larger than an inner diameter of the stator. An inner diameter of the stator may be larger than the outer diameter of the second bearing.

Particular embodiments described herein include a method for manufacturing a motor assembly. The method may include mounting a rotor on a rotation shaft; mounting a first bearing on the rotation shaft; mounting a second bearing on a rotation shaft; seating the first bearing in a first bearing housing; mounting a stator on an inner circumferential face of a motor housing; inserting the second bearing through an inner face of the stator; disposing the second bearing in a second bearing housing of the motor housing; and fastening the first bearing housing with the motor housing. An outer diameter of the first bearing may be larger than an outer diameter of the second bearing.

In some implementations, the system can optionally include one or more of the following features. The rotation shaft may have a first portion configured to mount the first bearing and a second portion configured to mount the second bearing. The first portion may have an outer diameter that is larger than an outer diameter of the second portion of the rotation shaft. The rotation shaft may include a first portion supported by the first bearing radially and axially relative to the rotational axis of the rotation shaft, and a second portion supported by the second bearing radially relative to the rotational axis of the rotation shaft. The method may include mounting a diffuser in the first bearing housing; and mounting an impeller to a portion of the rotation shaft that is axially closer to an end of the rotation shaft than the first bearing. The method may include fastening an inlet body with the motor housing. The inlet body may be configured to receive a first portion of the rotation shaft, the first bearing, the first bearing housing, the impeller, and the diffuser therein. The first portion of the rotation shaft may be configured to mount the first bearing. The motor housing may be configured to receive a second portion of the rotation shaft, the second bearing, at least a portion of the rotor, and at least a portion of the stator therein. The second portion of the rotation shaft may be configured to mount the second bearing.

One aspect of the present disclosure proposes a motor assembly including a rotation shaft, an impeller installed at one side of the rotation shaft, a rotor mounted on the rotation shaft to be spaced apart from the impeller by a predetermined spacing along an axial direction of the rotation shaft, a stator surrounding an outer face of the rotor such that the stator is spaced apart from the rotor by a predetermined spacing along a radial direction of the rotation shaft, a first bearing installed on the rotation shaft and installed between the impeller and the rotor to support rotation of the rotation shaft, and a second bearing installed on the rotation shaft at a side opposite to the first bearing with respect to the rotor to support the rotation of the rotation shaft, wherein an outer diameter of the first bearing is larger than an outer diameter of the second bearing.

In one implementation, an outer diameter of a portion of the rotation shaft for installing the first bearing thereon may be larger than an outer diameter of another portion of the rotation shaft for installing the second bearing thereon.

In one implementation, the first bearing may support a portion of the rotation shaft in the radial direction and in the axial direction of the rotation shaft, and the second bearing may support another portion of the rotation shaft in the radial direction of the rotation shaft.

In one implementation, the motor assembly may further include a first bearing housing for accommodating the first bearing therein, wherein the first bearing housing may include a first side support having a first through hole defined at a center thereof to be penetrated by the rotation shaft, wherein the first side support has at least a portion thereof overlapping the first bearing with respect to the radial direction of the rotation shaft to prevent a movement of the first bearing in the radial direction of the rotation shaft, and a first longitudinal support having at least a portion thereof overlapping with the first bearing with respect to the axial direction of the rotation shaft to prevent a movement of the first bearing in a direction towards the impeller with respect to the axial direction of the rotation shaft.

In one implementation, the first bearing may include a first inner ring fixed on an outer circumferential face of the rotation shaft, a first outer ring fixed to the first side support and the first longitudinal support of the first bearing housing, and a first rolling member interposed between the first inner ring and the first outer ring to support a relative rotational movement of the first inner ring relative to the first outer ring.

In one implementation, the rotation shaft may include an impeller coupling portion for installing the impeller thereon, a first bearing coupling portion for installing the first bearing thereon, a rotor coupling portion for installing the rotor thereon, and a second bearing coupling portion for installing the second bearing thereon.

In one implementation, an outer diameter of the first bearing coupling portion along the radial direction of the rotation shaft may be smaller than an outer diameter of the rotor coupling portion, and the first bearing and the rotation shaft may be in contact with each other on a first contact face, wherein the first contact face may extend along the radial direction of the rotation shaft.

In one implementation, the first inner ring may be fixed to an outer circumferential face of the first bearing coupling portion and the first contact face, and the first inner ring may rotate together with the rotation shaft when the rotation shaft rotates.

In one implementation, the rotation shaft may include a first step for seating the first bearing thereon, and the first step may prevent a movement of the first bearing in a direction toward the rotor with respect to the axial direction of the rotation shaft.

In one implementation, the motor assembly may further include a motor housing having an inner circumferential face for installing the stator thereon, wherein the motor housing may include a second side support having a second through hole defined at a center thereof to be penetrated by the rotation shaft, wherein the second side support has at least a portion thereof overlapping the second bearing with respect to the radial direction of the rotation shaft to prevent a movement of the second bearing in the radial direction of the rotation shaft, and a detachment preventing portion having at least a portion overlapping the second bearing with respect to the axial direction of the rotation shaft, and wherein the detachment preventing portion is spaced apart from the second bearing at a predetermined spacing.

In one implementation, the second bearing may include a second inner ring fixed on the outer circumferential face of the rotation shaft, a second outer ring fixed to the second side support of the second bearing housing, and a second rolling member interposed between the second inner ring and the second outer ring to support a relative rotational movement of the second inner ring with respect to the second outer ring.

In one implementation, an outer diameter of the second bearing coupling portion along the radial direction of the rotation shaft may be smaller than an outer diameter of the rotor coupling portion, and the second bearing and the rotor coupling portion may be in contact with each other on the second contact face, wherein the second contact face may extend along the radial direction of the rotation shaft.

In one implementation, the rotation shaft may include a second step for seating the second bearing thereon, and the second step may prevent a movement of the second bearing in a direction toward the impeller with respect to the axial direction of the rotation shaft.

In one implementation, the outer diameter of the first bearing may be larger than an inner diameter of the stator.

In one implementation, an inner diameter of the stator may be larger than the outer diameter of the second bearing.

Another aspect of the present disclosure proposes a method for manufacturing a motor assembly including installing a rotor, a first bearing, and a second bearing on a rotation shaft, seating the first bearing in a first bearing housing, installing a stator on an inner circumferential face of a motor housing, penetrating the second bearing through an inner face of the stator, accommodating the second bearing in a second bearing housing formed in the motor housing, and fastening the first bearing housing with the motor housing, wherein an outer diameter of the first bearing is larger than an outer diameter of the second bearing.

In one implementation, an outer diameter of a portion of the rotation shaft for installing the first bearing thereon may be larger than an outer diameter of another portion of the rotation shaft for installing the second bearing thereon.

In one implementation, the first bearing may support a portion of the rotation shaft in a radial direction and in an axial direction of the rotation shaft, and the second bearing may support another portion of the rotation shaft in the radial direction of the rotation shaft.

In one implementation, the method may further include installing a diffuser in the first bearing housing, and installing an impellor at one side of the rotation shaft to be closer to one end of the rotation shaft than the first bearing with respect to an axial direction of the rotation shaft.

In one implementation, the method may further include fastening an inlet body accommodating a portion of the rotation shaft for installing the first bearing thereon, the first bearing, the first bearing housing, the impeller, and the diffuser therein, with the motor housing accommodating another portion of the rotation shaft for installing the second bearing thereon, the second bearing, at least a portion of the rotor, and at least a portion of the stator therein.

The features of the above-described implantations may be combined with other embodiments as long as they are not contradictory or exclusive to each other.

Effects of the present disclosure are as follows but are limited thereto.

According to the motor assembly and the method for manufacturing the same according to embodiments of the present disclosure as described above, the two bearings having the different outer diameters support the rotation shaft. Further, the bearing having the relatively large outer diameter supports the one side of the rotation shaft in the axial direction and in the radial direction, and the bearing having the relatively small outer diameter supports the other side of the rotation shaft in the radial direction, thereby realizing the high speed of the motor, and at the same time, reflecting the trend of the miniaturization and the weight lightening of the motor assembly.

Further, according to the motor assembly and the method for manufacturing the same according to embodiments of the present disclosure as described above, the two bearings having the different outer diameters support the rotation shaft, and the bearing having the relatively large outer diameter supports the rotation shaft in the axial direction and the radial direction, thereby sufficiently securing the life of the bearing structure.

Further, according to the motor assembly and the method for manufacturing the same according to embodiments of the present disclosure as described above, the two bearings having the different outer diameters support the rotation shaft, and the bearing having the relatively small outer diameter supports the rotation shaft in the radial direction, thereby reducing a size and a weight of the motor assembly.

Further, according to the motor assembly and the method for manufacturing the same according to embodiments of the present disclosure as described above, the both sides of the rotation shaft are respectively supported by the bearings along the axial direction of the rotation shaft, so that the rotation shaft rotating at a high speed may be stably supported, thereby securing the reliability and the durability of the bearing structure.

Further, according to the motor assembly and the method for manufacturing the same according to embodiments of the present disclosure as described above, the bearing having the relatively small outer diameter may pass through the inner face of the stator during the assembly of the motor assembly, thereby reducing the assembly costs of the motor assembly.

BRIEF DESCRIPTION OF THE DRAWINGS

Embodiments of the present disclosure may be easily understood by a combination of a following detailed description and accompanying drawings. Further, reference numerals refer to structural elements.

DETAILED DESCRIPTIONS

Figure 1:
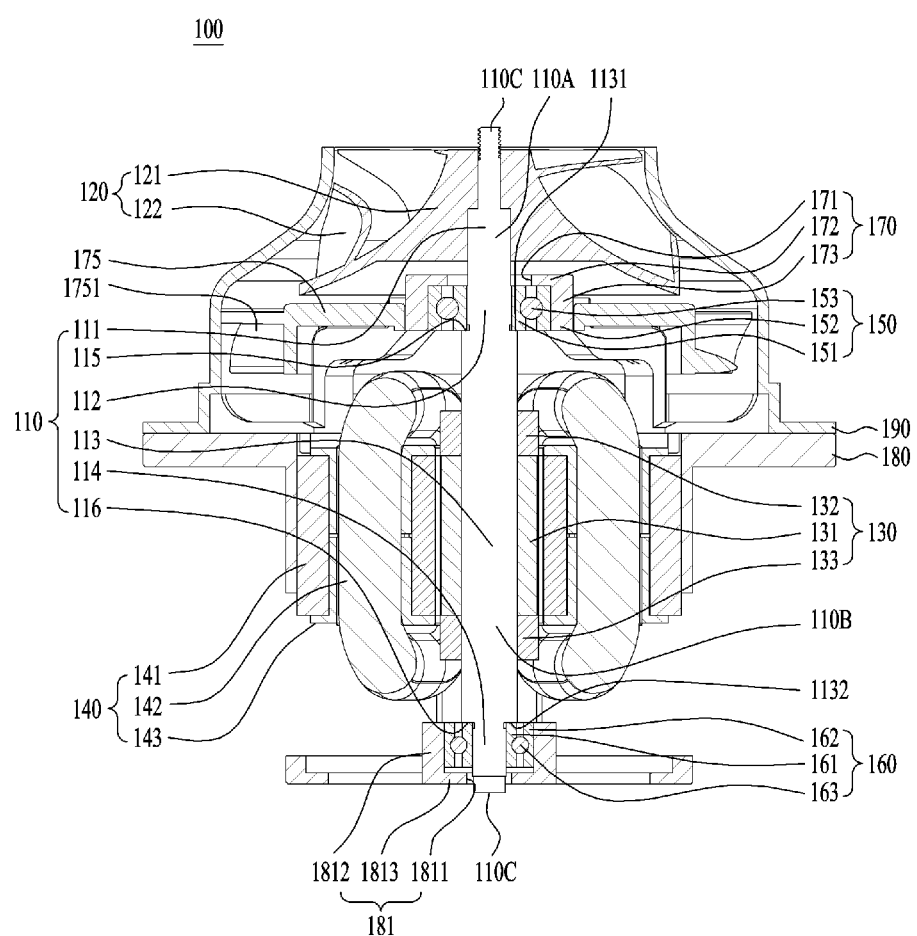
FIG. 1 is a cross-sectional view illustrating each component of a motor assembly according to an embodiment of the present disclosure.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
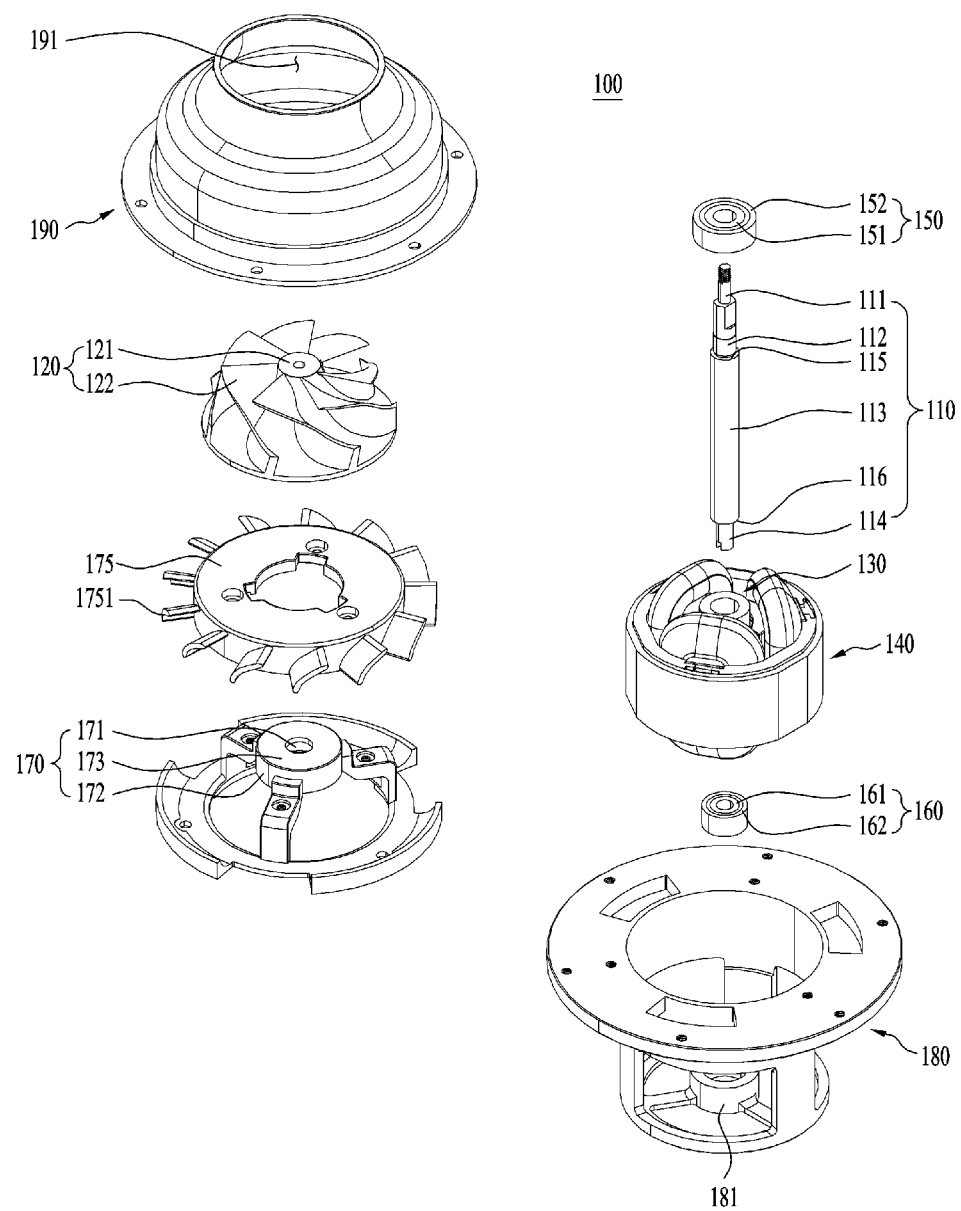
FIG. 2 is an exploded perspective view of the motor assembly shown in FIG. 1.
Figure 3:
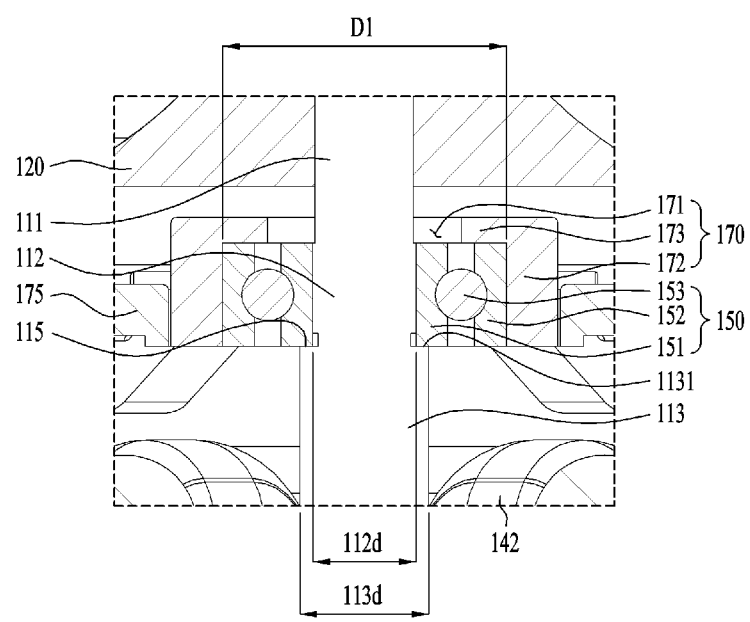
FIG. 3 is an enlarged cross-sectional view enlarging and illustrating in detail a portion of the motor assembly shown in FIG. 1.
Figure 4:
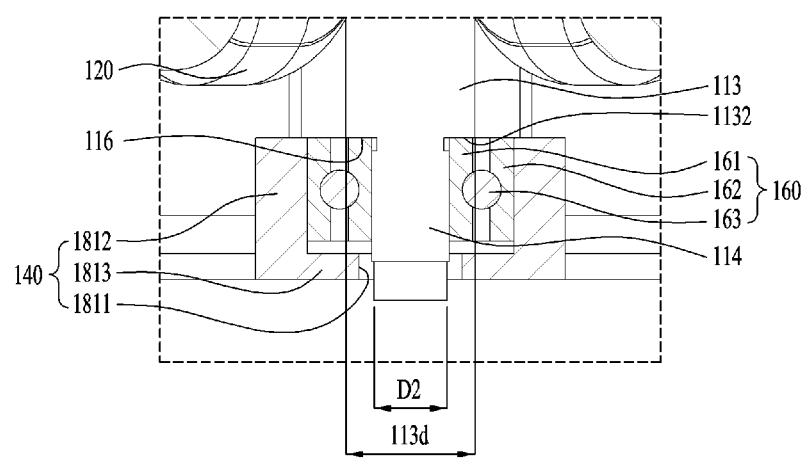
FIG. 4 is an enlarged cross-sectional view enlarging and illustrating in detail another portion of the motor assembly shown in FIG. 1.

FIG. 1 is a cross-sectional view illustrating each component of a motor assembly according to an embodiment of the present disclosure. Further, FIG. 2 is an exploded perspective view of the motor assembly shown in FIG. 1. Further, FIG. 3 is an enlarged cross-sectional view enlarging and illustrating in detail a portion of the motor assembly shown in FIG. 1. Further, FIG. 4 is an enlarged cross-sectional view enlarging and illustrating in detail another portion of the motor assembly shown in FIG. 1.

Referring to FIGS. 1 and 2, a motor assembly 100 includes a rotation shaft 110, an impeller 120, a rotor 130, a stator 140, a first bearing 150, a second bearing 160, a first bearing housing 170, a motor housing 180, and an inlet body 190. In this connection, the motor housing 180 and the inlet body 190 are for forming an outer shape of the motor assembly 100, which may accommodate all other components in an empty space defined therein.

Specifically, an internal space of the motor assembly 100 may be divided into an impeller space S1 that is an empty space defined inside the inlet body 190 and a motor space S2 that is an empty space defined inside the motor housing 180. Gas flowing through the impeller space S1 and the motor space S2 may cool each component disposed inside the motor assembly 100, and accordingly, reduce heat generation of the motor assembly 100.

The rotation shaft 110 may extend to cross the impeller space S1 and the motor space S2. In other words, the rotation shaft 110 may extend in a longitudinal direction, that is, an axial direction L of the motor assembly 100.

Hereinafter, a portion of the rotation shaft 110 accommodated inside the inlet body 190 will be defined as one side 110A of the rotation shaft 110, and another portion of the rotation shaft 110 accommodated inside the motor housing 180 will be defined as the other side 110B.

In detail, the rotation shaft 110 may be accommodated inside the first bearing housing 170, the motor housing 180, and the inlet body 190. That is, a portion of the rotation shaft 110 may be accommodated in the inlet body 190 and the other portion thereof may be accommodated in the motor housing 180 along the longitudinal direction. More specifically, the portion of the rotation shaft 110 accommodated in the inlet body 190 may be accommodated in the first bearing housing 170. In other words, the one side 110A of the rotation shaft 110 may be disposed at the first bearing housing 170 and the inlet body 190 side, and the other side 110B of the rotation shaft 110 may be disposed at the motor housing 180 side.

One end 110C of rotation shaft 110 may be a free end not supported by the first bearing housing 170 or the inlet body 190, and the other end 110D thereof may also be a free end that is not supported by the motor housing 180. In this connection, the "free end" may mean the both ends of the rotation shaft 110 that are not supported or constrained by any component.

The one end 110C of the rotation shaft 110 may be close to the impeller 120 among the impeller 120 and the rotor 130, and may be the free end at the impeller 120 side. Further, the other end 110D of the rotation shaft 110 may be close to the rotor 130 among the impeller 120 and the rotor 130, and may be the free end at the rotor 130 side.

In one example, as will be described later, the rotation shaft 110 may be supported by a plurality of bearings between the one end 110C and the other end 110D thereof. In this connection, the plurality of bearings may mean rolling bearings implemented by a coupling structure between the first bearing 150 and the second bearing 160, the first bearing housing 170, and the second bearing housing 181 to be described later, and these will be described in detail below.

Specifically, the rotation shaft 110 may include an impeller coupling portion 111 on which the impeller 120 is installed, a first bearing coupling portion 112 on which the first bearing 150 is installed, a rotor coupling portion 113 on which the rotor 130 is installed, and a second bearing coupling portion 114 on which the second bearing 160 is installed.

The impeller coupling portion 111 is a portion of the rotation shaft 110 on which the impeller 120 is installed, and is a portion adjacent to the one side 110A, particularly to the one end 110C of the rotation shaft 110. The impeller coupling portion 111 may be disposed in the impeller space S1, and disposed particularly to be adjacent to an inlet 191 of the inlet body 190, through which gas is flowed from the outside.

The first bearing coupling portion 112 is a portion of the rotation shaft 110 on which the first bearing 150 to be described later is installed, and a portion corresponding to the one side 110A of the rotation shaft 110, which may be disposed in the impeller space S1. That is, the first bearing coupling portion 112 is a portion of the rotation shaft 110 overlapping the first bearing 150 along a radial direction R of the rotation shaft 110, which may be supported in the radial direction R and the axial direction L by the first bearing 150.

The rotor coupling portion 113 is portion of the rotation shaft 110 on which the rotor 130 is installed, and a portion of the rotation shaft 110 positioned at a position biased to the other side 110B with respect to the longitudinal direction of the rotation shaft 110, which may be disposed in the motor space S2. That is, the rotor coupling portion 113 may be a portion of the rotation shaft 110 overlapping the rotor 130 along the radial direction R of the rotation shaft 110.

The second bearing coupling portion 114 is a portion of the rotation shaft 110 on which the second bearing 160 to be described later is installed, and is a portion corresponding to the other side 110B of the rotation shaft 110. In particular, the second bearing coupling portion 114 is a portion closer to the other end 110D of the rotation shaft 110 than the rotor coupling portion 113, which may be disposed in the motor space S2. That is, the second bearing coupling portion 114 is another portion of the rotation shaft 110 overlapping the second bearing 160 along the radial direction R of the rotation shaft 110, which may be supported in the radial direction R by the second bearing 160.

The rotation shaft 110 may rotate by an electromagnetic interaction between the rotor 130 and the stator 140. As the rotation shaft 110 rotates, the impeller 120 coupled to the rotation shaft 110 may also rotate together with the rotation shaft 110. Further, as the impeller 120 rotates, the gas may be sucked into the motor assembly 100.

The impeller 120 may be installed at the one side 110A of the rotation shaft 110. That is, the impeller 120 may be installed opposite to the other side 110B of the rotation shaft 110 on which the rotor 130 is installed with respect to the axial direction L of the rotation shaft 110. As described above, the impeller 120 may be fastened to the impeller coupling portion 111 of the rotation shaft 110 and rotate together with the rotation shaft 110 as the rotation shaft 110 rotates, and may be disposed in the impeller space S1 defined in the inlet body 190.

Specifically, the impeller 120 may include a hub 121 and a plurality of blades 122 protruding outward from an outer circumference of the hub 121. In one example, the impeller 120 may be made of a high strength synthetic resin material such as polyetheretherketone (PEEK) as a material thereof. However, the material of the impeller 120 may not be limited thereto, and may be made of metal as well as other high strength synthetic resin.

In addition, the impeller 120 may be a diagonal flow type impeller that sucks the gas such as air in the axial direction L of the rotation shaft 110 and discharges the gas in an oblique direction between a centrifugal direction and the axial direction.

That is, the gas flowing into the inlet body 190 through the inlet 191 may be guided toward the motor housing 180 along an outer surface of the hub 121 as the blades 122 rotate. However, embodiments of the present disclosure are not limited thereto, and the impeller 120 may be configured as a centrifugal impeller that sucks the gas in the axial direction and discharges the gas in the centrifugal direction. However, hereinafter, for convenience of description, the impeller 120 will be described based on a case of the diagonal flow type impeller.

The rotor 130 may be installed on the rotation shaft 110 to be spaced apart from the impeller 120 along the axial direction of the rotation shaft 110 by a predetermined spacing. In other words, the rotor 130 may be installed on the rotor coupling portion 113 positioned at the position biased to the other side 110B from a center with respect to the longitudinal direction of the rotation shaft 110. That is, the rotor 130 may be coupled to the rotation shaft 110 to surround an outer circumferential face of the rotation shaft 110, and may be disposed at the motor space S2 in which the rotor coupling portion 113 is disposed.

In detail, the rotor 130 may include a magnet 131 and a magnet core (not shown) on which the magnet 131 is mounted. In addition, the rotor 130 may further include a first end plate 132 and a second end plate 133 spaced apart from each other by a predetermined spacing about the magnet 131 along the axial direction L of the rotation shaft 110.

The stator 140 may be installed on an inner circumferential face of the motor housing 180 to surround an outer face of the rotor 130 such that the stator 140 is spaced apart from the rotor 130 by a predetermined spacing along the radial direction R of the rotation shaft 110. That is, the stator 140 may be disposed in the motor space S2 in which the rotor coupling portion 113 of the rotation shaft 110 is located like the rotor 130.

Specifically, the stator 140 may include a stator core 141 made of a conductor, a coil 142 wound around the stator core 141, and an insulator 143 that electrically insulates the stator core 141 from the coil 142. A current may be applied to the coil 142, and as the current is applied to the coil 142, the rotor 130 may rotate relative to the stator 140.

The first bearing 150 may be installed at the one side 110A of the rotation shaft 110 to support the rotation of the rotation shaft 110, and may be disposed between the impeller 120 and the rotor 130. As will be described in more detail later, the first bearing 150 may support the one side 110A of the rotation shaft 110 in the radial direction R and in the axial direction L of the rotation shaft 110 by a coupling relationship with the first bearing housing 170. As described above, the first bearing 150 may be installed at an outer circumferential face of the first bearing coupling portion 112 positioned at the one side 110A of the rotation shaft 110.

Specifically, the first bearing 150 may include a first inner ring 151 installed on an outer circumferential face of the rotation shaft 110, a first outer ring 152 fixed to a first side support 172 and a first longitudinal support 173 of the first bearing housing 170, and a first rolling member 153 interposed between the first inner ring 151 and the first outer ring 152 to support a relative rotational movement of the first inner ring 151 relative to the first outer ring 152.

In this connection, the first bearing housing 170 accommodates the first bearing 150 therein and is coupled to the motor housing 180. The first side support 172 may extend in the axial direction L of the rotation shaft 110, and the first longitudinal support 173 may extend in the radial direction R of the rotation shaft 110. The first longitudinal support 173 may be in contact with the first outer ring 152, a center thereof may be perforated, and the rotation shaft 110 may penetrate the perforated hole.

Referring to FIG. 3, an outer diameter 112d of the first bearing coupling portion 112 along the radial direction R of the rotation shaft 110 is smaller than an outer diameter 113d of the rotor coupling portion 113. Further, a first contact face 1131 on which portions of the first bearing 150 and the rotation shaft 110 are in contact with each other may extend along the radial direction R of the rotation shaft 110.

Specifically, the first inner ring 151 of the first bearing 150 may be fixed to the outer circumferential face of the first bearing coupling portion 112 and the first contact face 1131. Accordingly, when the rotation shaft 110 rotates, the first inner ring 151 of the first bearing 150 may also rotate with the rotation shaft 110.

In one example, the first outer ring 152 of the first bearing 150 may be fixed to the first side support 172 and the first longitudinal support 173 of the first bearing housing 170. Accordingly, a portion of the rotation shaft 110, that is, the first bearing coupling portion 112 may be supported in the radial direction R and the axial direction L by the first bearing 150.

As will be described later, the first bearing housing 170 may maintain a fixed state inside the inlet body 190 regardless of the rotation of the rotation shaft 110, so that the first outer ring 152 may also remain fixed with the first bearing housing 170 even when the rotation shaft 110 rotates.

When expressing such structure differently, the rotation shaft 110 may further include a first step 115 on which the first bearing 150 is seated. A length of the first step 115 may correspond to a difference between the outer diameter 113d of the rotor coupling portion 113 and the outer diameter 112d of the first bearing coupling portion 112. The first step 115 may prevent a movement of the first bearing 150 in a direction toward the rotor 130 with respect to the axial direction L of the rotation shaft 110, that is, in a direction toward the other side 110B from the one side 110A of the rotation shaft 110.

As such, the first bearing 150 may be accommodated in the first bearing housing 170. Further, the first bearing housing 170 will be described in more detail below.

The second bearing 160 may be installed at the other side 110B of the rotation shaft 110 to support the rotation of the rotation shaft 110, and may be disposed to be closer to the other end 110D of the rotation shaft 110 than the rotor 130 with respect to the axial direction L of the rotation shaft 110. As will be described later, the second bearing 160 may support the other side 110B of the rotation shaft 110 in the radial direction R of the rotation shaft 110 by a coupling relationship with the second bearing housing 181. As described above, the second bearing 160 may be installed on the outer circumferential face of the second bearing coupling portion 114 located at the other side 110B of the rotation shaft 110.

Specifically, the second bearing 160 may include a second inner ring 161 installed on the outer circumferential face of the rotation shaft 110, a second outer ring 162 fixed to a second side support 1812 of the second bearing housing 181, and a second rolling member 163 interposed between the second inner ring 161 and the second outer ring 162 to support a relative rotational movement of the second inner ring 161 with respect to the second outer ring 162.

Referring to FIG. 4, an outer diameter 114d of the second bearing coupling portion 114 along the radial direction R of the rotation shaft 110 is smaller than an outer diameter 113d of the rotor coupling portion 113, and a second contact face 1132 on which the second bearing 160 and the rotor coupling portion 113 are in contact with each other may extend along the radial direction R of the rotation shaft 110.

Specifically, the second inner ring 161 of the second bearing 160 may be fixed to the outer circumferential face of the second bearing coupling portion 114 and the second contact face 1132. Accordingly, when the rotation shaft 110 rotates, the second inner ring 161 of the second bearing 160 may also rotate together with the rotation shaft 110.

In one example, the second outer ring 162 of the second bearing 160 may be fixed to the second side support 1812 of the second bearing housing 181. Accordingly, another portion of the rotation shaft 110, that is, the second bearing coupling portion 114 may be supported in the radial direction R by the second bearing 160.

As will be described later, because the second bearing housing 181 may remain fixed regardless of the rotation of the rotation shaft 110, the second outer ring 162 may also remain fixed to the second bearing housing 181 even when the rotation shaft 110 rotates.

When expressing such structure differently, the rotation shaft 110 may further include a second step 116 on which the second bearing 160 is seated. A length of the second step 116 may correspond to a difference between the outer diameter 113d of the rotor coupling portion 113 and the outer diameter 114d of the second bearing coupling portion 114. The second step 116 may prevent a movement of the second bearing 160 in a direction toward the impeller 120 with respect to the axial direction L of the rotation shaft 110, that is, in a direction toward the one side 110A from the other side 110B of the rotation shaft 110.

As such, the second bearing 160 may be accommodated in the second bearing housing 181. Further, the second bearing housing 181 will be described in more detail below.

The first bearing housing 170 may be coupled to the motor housing 180 in a state in which the first bearing 150 is accommodated therein. Specifically, the first bearing housing 170 may include the first side support 172 having a first through hole 171 through which the rotation shaft 110 penetrates defined at the center thereof, and having at least a portion thereof overlapping the first bearing 150 with respect to the radial direction R of the rotation shaft 110 to prevent the movement of the first bearing 150 in the radial direction R of the rotation shaft 110, and the first longitudinal support 173 having at least a portion thereof overlapping with the first bearing 150 with respect to the axial direction L of the rotation shaft 110 to prevent the movement of the first bearing 150 in a first direction towards the impeller 120 with respect to the axial direction L of the rotation shaft 110.

In addition, the first bearing housing 170 may be installed between the impeller 120 and the rotor 130 like the first bearing 150. That is, the first bearing housing 170 may surround a portion of the rotation shaft 110, that is, the outer circumferential face of the first bearing coupling portion 112.

In one example, the first bearing housing 170 may be formed integrally with a diffuser 175 to be described later. Preferably, the first bearing housing 170 may be fastened with the diffuser 175 after being manufactured separately from the diffuser 175. When the first bearing housing 170 and the diffuser 175 are integrally formed, an assembly tolerance may be reduced relatively, thereby smoothly flowing the gas flowing into the inlet body 190.

Referring to FIGS. 1 and 2, the diffuser 175 may be installed between the impeller 120 and the first bearing housing 170 to guide the gas flowed into the inlet body 190 to the motor housing 180. That is, a predetermined space through which the gas may flow may be defined between the diffuser 175 and the inlet body 190. The diffuser 175 may be fastened and fastened to the first bearing housing 170 through a fastening member (not shown) such as a bolt and a nut.

A plurality of diffuser vanes 1751 protruding toward an inner surface of the inlet body 190 may be formed on an outer surface of the diffuser 175. The plurality of diffuser vanes 1751 may be arranged on the outer surface of the diffuser 175 to be spaced from each other at a substantially the same spacing along a circumferential direction. In addition, the diffuser 175 may further include a through hole (not shown) defined therein through which the rotation shaft 110 and the first bearing housing 170 pass.

Based on such structure, the gas flowed into the inlet body 190 through the inlet 191 may be guided into a space between the inlet body 190 and the diffuser 175 by the impeller 120, and the gas flowed to the space between the inlet body 190 and the diffuser 175 may be guided from the impeller space S1 to the motor space S2 by the diffuser vanes 1751.

The motor housing 180 may be formed to surround an outer circumference of the stator 140 and may be fastened with the inlet body 190 to form the outer shape of the motor assembly 100. In detail, the motor space S2 in which the other side 110B of the rotation shaft 110, the rotor 130, the stator 140, and the second bearing 160 may be accommodated may be defined inside the motor housing 180.

In one example, the motor housing 180 may include the second bearing housing 181 for accommodating the second bearing 160 therein. In detail, the second bearing housing 181 may include the second side support 1812 that may have a second through hole 1811 through which the rotation shaft 110 penetrates defined at a center thereof, wherein the second side support 1812 has at least a portion thereof overlapping the second bearing 160 with respect to the radial direction R of the rotation shaft 110 to prevent a movement of the second bearing 160 in the radial direction R of the rotation shaft 110, and a detachment preventing portion 1813 having at least a portion overlapping the second bearing 160 with respect to the axial direction L of the rotation shaft 110, and spaced apart from the second bearing 160 at a predetermined spacing.

In addition, the second bearing housing 181 may be installed at a position adjacent to the other side 110B of the rotation shaft 110, in particular, to the other end 110D like the second bearing 160. That is, the second bearing housing 181 may surround another portion of the rotation shaft 110, that is, the outer circumferential face of the second bearing coupling portion 114.

In addition, the motor housing 180 may include an outlet 182 through which the gas guided from the impeller space S1 to the motor space S2 is discharged to the outside of the motor housing 180 by the rotation of the impeller 120, and the outlet 182 may be defined at the opposite side of the inlet 191 with respect to a flow direction of the gas.

The inlet body 190 may include the inlet 191 through which the gas is sucked, and may be disposed to surround an outer circumference of the impeller 120. That is, the impeller space S1 in which the impeller 120 is rotatably disposed may be defined inside the inlet body 190. Further, an outer surface of the inlet body 190 may correspond to a shape of the impeller 120, and an inner surface of the inlet body 190 may be curved so as to stably guide the gas flowing along the impeller space S1.

Specifically, a side opposite to the inlet 191 of the inlet body 190 may be fastened to the motor housing 180 to form the outer shape of the motor assembly 100. The motor housing 180 and the inlet body 190 may be fastened to be in close contact with each other such that the gas flowing inside the motor assembly 100 does not leak to the outside through a space other than the outlet 182.

That is, it is preferable to fasten the motor housing 180 and the inlet body 190 with each other tightly such that no gap is defined between the motor housing 180 and the inlet body 190. Further, as a fastening scheme, various schemes, for example, screwing, fitting, and the like, may be used, but is not limited to one particular scheme.

In other words, the motor housing 180 and the inlet body 190 may be a kind of casing having a hollow therein, and the rotation shaft 110 may extend in the axial direction L in an empty space at a center of the motor housing 180 and the inlet body 190. As shown in the drawing, the rotation shaft 110 may not be directly supported by the motor housing 180 or the inlet body 190. That is, the motor housing 180 or the inlet body 190 may not include a separate rotation shaft supporter (tentative name) for supporting the rotation shaft 110.

Figure 5:
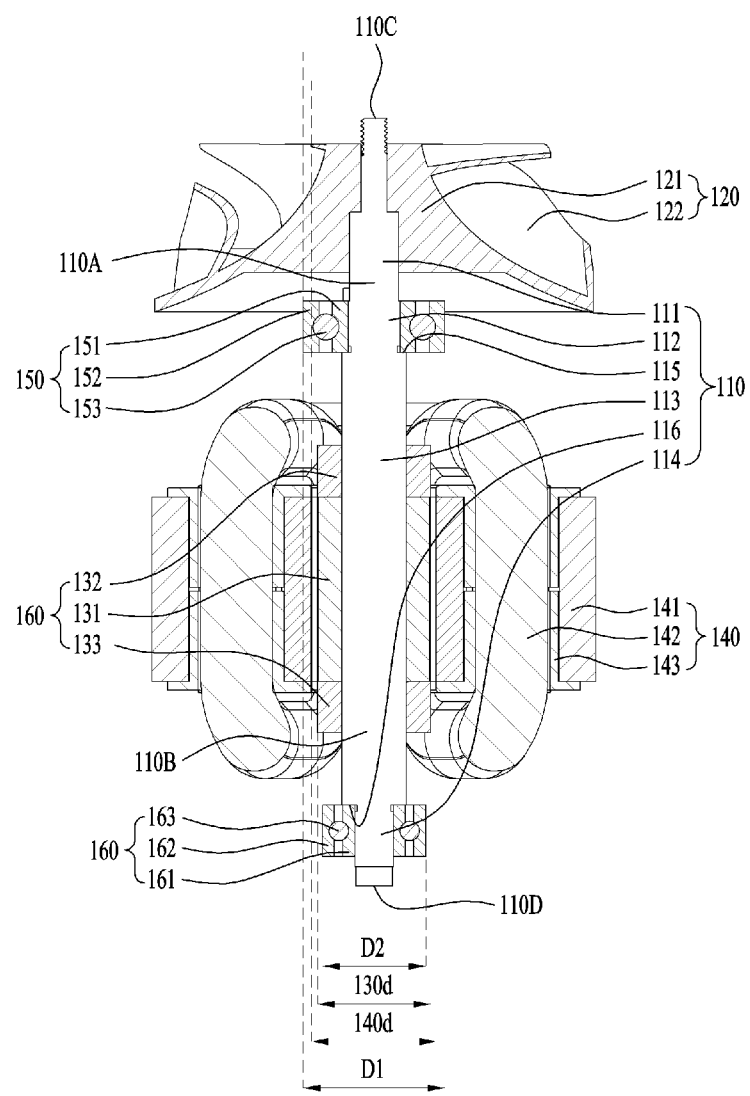
FIG. 5 is an exploded cross-sectional view in which some of the components of the motor assembly shown in FIG. 1 are omitted to compare an outer diameter of a first bearing and an outer diameter of a second bearing, an outer diameter of a rotor, and an inner diameter of a stator with each other.

FIG. 5 is an exploded cross-sectional view in which some of the components of the motor assembly shown in FIG. 1 are omitted to compare an outer diameter of a first bearing and an outer diameter of a second bearing, an outer diameter of a rotor, and an inner diameter of a stator with each other.

Referring to FIG. 5, the outer diameter D1 of the first bearing 150 may be larger than the outer diameter D2 of the second bearing 160. In addition, the outer diameter 112d of the first bearing coupling portion 112 on which the first bearing 150 is installed may be larger than the outer diameter 114d of the second bearing coupling portion 114 on which the second bearing 160 is installed.

In general, in a case of the rolling bearings such as the first bearing 150 and the second bearing 160, a factor that most affects a fatigue life of the bearing is a size of the bearing. For example, the larger the bearing, the more stable and longer the rotation shaft may be supported by the bearing. However, when designing the bearing used in the motor assembly 100 to be large, for example, a size of a component for accommodating and supporting the bearing, such as the first bearing housing 170 and the second bearing housing 181, must also be large, so that an overall size of the motor assembly 100 is inevitably increased.

In addition, although it will be described in more detail below with reference to FIGS. 6 to 13, in a process of assembling the components of the motor assembly 100 with each other, in order to reduce assembly costs and improve a convenience of the assembly, the outer diameter D2 of the second bearing 160 may be smaller than the inner diameter 140d of the stator 140.

Specifically, in the process of assembling the components of the motor assembly 100 in order, particularly, when the first bearing housing 170 and the motor housing 180 are to be fastened (see FIG. 12) in a state in which the rotation shaft 110, the first bearing 150, the second bearing 160, and the rotor 130 are installed in the first bearing housing 170, because the assembly is performed while the second bearing 160 moves in a direction penetrating the inner face of the stator 140 (see FIG. 12) in a state in which the stator 140 is installed on the inner circumferential face of the motor housing 180, and further, in a state in which the bearing 160 is installed at the other side 110B of the rotation shaft 110. Therefore, when the outer diameter D2 of the second bearing 160 is larger than the inner diameter 140d of the stator 140, there is a limitation that an existing assembly scheme may not be applied.

That is, installing the stator 140 on the inner circumferential face of the motor housing 180 and installing the second bearing 160 separately from the stator 140 at the other side 110B of the rotation shaft 110 after fastening the first bearing housing 170 and the motor housing 180 with each other may be very disadvantageous for the convenience of the assembly process, lead to inevitable increase of the assembly costs, and in addition, may cause deformation or breakage of another component in the assembly process.

Therefore, in order to improve the durability and the life of the bearing, it is advantageous to enlarge the size of the bearing, but, in order to ensure the convenience of assembly, it is preferable that a diameter of the bearing is smaller than the inner diameter 140d of the stator 140. Accordingly, the second bearing 160 will have a practically maximum size, that is, a maximum outer diameter D2 will be the inner diameter 140d of the stator 140.

In this situation, the biggest goal in designing the motor assembly 100 is the weight lightening and realization of high speed of the motor assembly 100. To this end, it should be considered that the inner diameter 140d of the stator 140 should be designed to be small (that is, consequently a size of the motor housing surrounding the stator becomes also small).

As described above, when the inner diameter 140d of the stator 140 becomes smaller, the outer diameter D2 of the second bearing 160 may also become smaller. Therefore, in order for the weight lightening and realization of the high speed of the motor assembly 100, the size of the second bearing 160, which must penetrate the inner face of the stator 140 during the assembling, will also be reduced, and accordingly, the life of the second bearing 160 will be inevitably reduced.

In order to solve this problem, the outer diameter D2 of the second bearing 160, which must pass through the inner face of the stator 140 during the assembling is designed to be smaller than the inner diameter 140d of the stator 140, and at the same time, the second bearing 160 is formed to be free of a thrust force of the rotation shaft 110, but to support the other side 110B of the rotation shaft 110 only in the radial direction R, thereby ensuring the life of the bearing. Further, the first bearing 150 is formed to support the one side 110A of the rotation shaft 110 in the radial direction R and in the axial direction L (i.e., the thrust force), and to have a size larger than the second bearing 160 (D1>D2), thereby realizing the weight lightening and the high speed of the motor assembly 100, and at the same time, ensuring sufficient fatigue lives of the bearings that support the rotation shaft 110.

That is, according to an embodiment of the present disclosure as described above, the rotation shaft 110 is supported by the first bearing 150 and the second bearing 160 having different outer diameters support the rotation shaft 110. Specifically, the first bearing 150 having the relatively large outer diameter D1 supports the first bearing coupling portion 112 of the rotation shaft 110 in the axial direction L and in the radial direction R, and the second bearing 160 having the relatively small outer diameter D2 supports the second bearing coupling portion 114 of the rotation shaft 110 in the radial direction R, thereby realizing the high speed of the motor, and at the same time, reflecting the trend of the miniaturization and the weight lightening of the motor assembly 100.

Further, according to an embodiment of the present disclosure as described above, the rotation shaft 110 is supported by the two bearings 150 and 160 having the different outer diameters D1 and D2, and the first bearing 150 having the relatively large outer diameter D1 supports the one side of the rotation shaft 110 in the axial direction L and the radial direction R, thereby sufficiently ensuring the lives of the bearing structures.

Further, according to an embodiment of the present disclosure as described above, the rotation shaft 110 is supported by the two bearings 150 and 160 having the different outer diameters D1 and D2, and the second bearing 160 having the relatively small outer diameter D2 supports the other side 110B of the rotation shaft 110 in the radial direction R, thereby reducing the size and weight of the motor assembly 100.

Further, according to an embodiment of the present disclosure as described above, the both sides, that is, the one side 110A and the other side 110B of the rotation shaft are supported along the axial direction L of the rotation shaft 110 by the first bearing 150 and the second bearing 160, respectively, so that the rotation shaft 110 rotating at the high speed may be stably supported, thereby ensuring the reliability and the durability of the bearing structure.

Further, according to an embodiment of the present disclosure as described above, the second bearing 160 having the relatively small outer diameter D2 may penetrate the inner face of the stator 140 when the motor assembly 100 is assembled, thereby reducing the assembly costs of the motor assembly 100.

Specifically, referring back to FIG. 3, the first outer ring 152 of the first bearing 150 is supported in the radial direction R of the rotation shaft 110 by the first side support 172 of the first bearing housing 170, and the first bearing housing 170 remains fixed regardless of the rotation of the rotation shaft 110, so that the first bearing 150 may support the rotation shaft 110 in the radial direction R.

In addition, the first outer ring 152 of the first bearing 150 is supported in the axial direction L of the rotation shaft 110 by the first longitudinal support 173 of the first bearing housing 170, and the first bearing housing 170 remains fixed regardless of the rotation of the rotation shaft 110, so that the first bearing 150 may support the rotation shaft 110 in the axial direction L.

In this connection, a state in which the first outer ring 152 is supported in the axial direction L by the first longitudinal support 173 may mean that, although the rotation shaft 110 ascends by the thrust force when the rotation shaft 110 rotates at the high speed, the first longitudinal support 173 prevents a movement of the first outer ring 152 in the axial direction L, so that the rotation shaft 110 may be supported such that the rotation shaft 110 does not ascend along the axial direction L.

In this connection, when it is described that the rotation shaft 110 rotates at the high speed, the "high speed" means a case in which the rotation shaft 110 rotates at tens of thousands of RPM (revolutions per minute), and may preferably mean a case in which rotation shaft 110 rotates at 100,000 RPM or higher.

In one example, referring back to FIG. 4, the second outer ring 162 of the second bearing 160 is supported by the second side support 1812 of the second bearing housing 181 in the radial direction R of the rotation shaft 110, and the second bearing housing 181 remains fixed regardless of the rotation of the rotation shaft 110, so that the second bearing 160 may support the rotation shaft 110 in the radial direction R.

In addition, an empty space may be defined between the second bearing 160 and the detachment preventing portion 1813. In such empty space, although not shown in the drawing, an elastic member (not shown) such as a wave washer may be interposed to elastically support (preload) the second bearing 160 in the axial direction L of the rotation shaft 110. However, the elastic member may not be limited to the wave washer, but may be made of a material having elasticity such as a general spring.

However, the second outer ring 162 of the second bearing 160 may have a predetermined degree of freedom in the axial direction L, like the first outer ring 152 of the first bearing 150. That is, the second outer ring 162 may be slid along the axial direction L of the rotation shaft 110 in a space defined between the second step 116 of the rotation shaft 110 and the cover 1813.

For example, when the rotation shaft 110 rotates at the high speed, the rotation shaft 110 may receive the thrust force in a direction opposite to the direction in which the gas is flowed through the inlet 191, that is, a direction in which the rotation shaft 110 and the impeller 120 ascend, and thus ascend along the space defined between the second step 116 and the cover 1813. When the rotation of the rotation shaft 110 is stopped, the rotation shaft 110 may again move in a direction descending along the space defined between the second step 116 and the cover 1813 by gravity.

Hereinafter, a method for manufacturing the motor assembly 100 according to an embodiment of the present disclosure will be described in detail with reference to FIGS. 6 to 13. In addition, FIGS. 6 to 13 are illustrated for a purpose of describing an order of manufacturing the motor assembly 100 in detail, a detailed description of each component of the motor assembly 100 will be described with reference to FIGS. 1 to 5.

Figure 6:
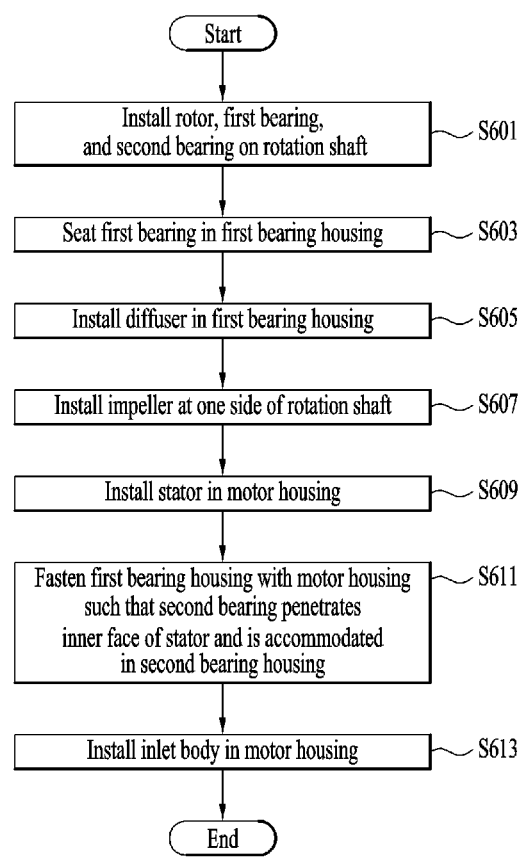
FIG. 6 is a flowchart schematically illustrating a method for manufacturing the motor assembly shown in FIG. 1.
Figure 7:
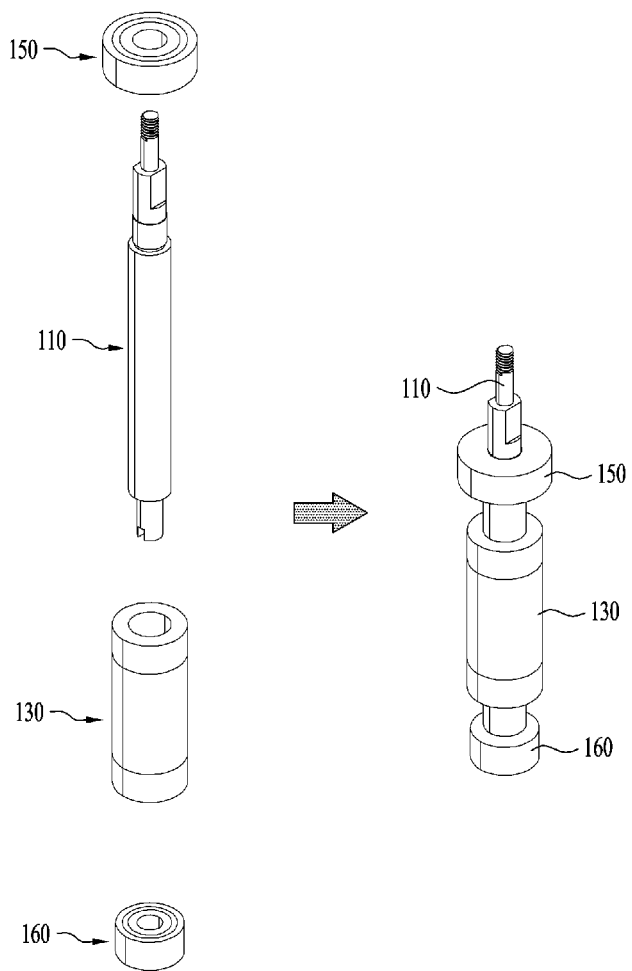
FIG. 7 is a perspective view illustrating a state in which a first bearing, a second bearing, and a rotor are installed on a rotation shaft.
Figure 8:
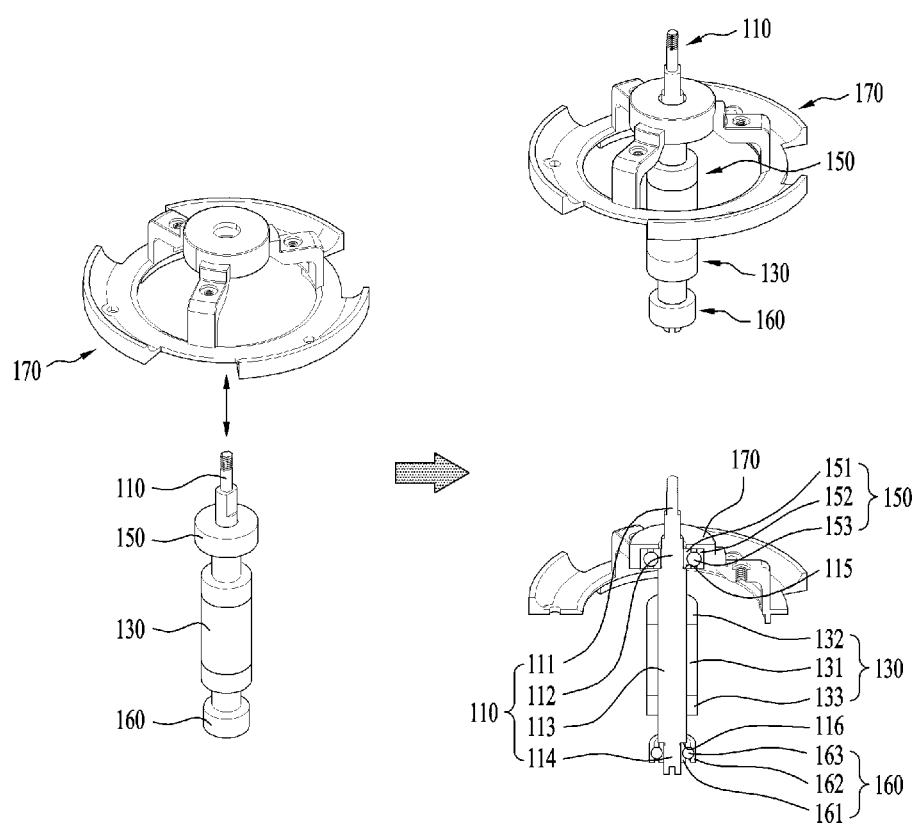
FIG. 8 is a perspective view illustrating a state in which a rotation shaft on which a first bearing, a second bearing, and a rotor are installed is installed in a first bearing housing.
Figure 9:
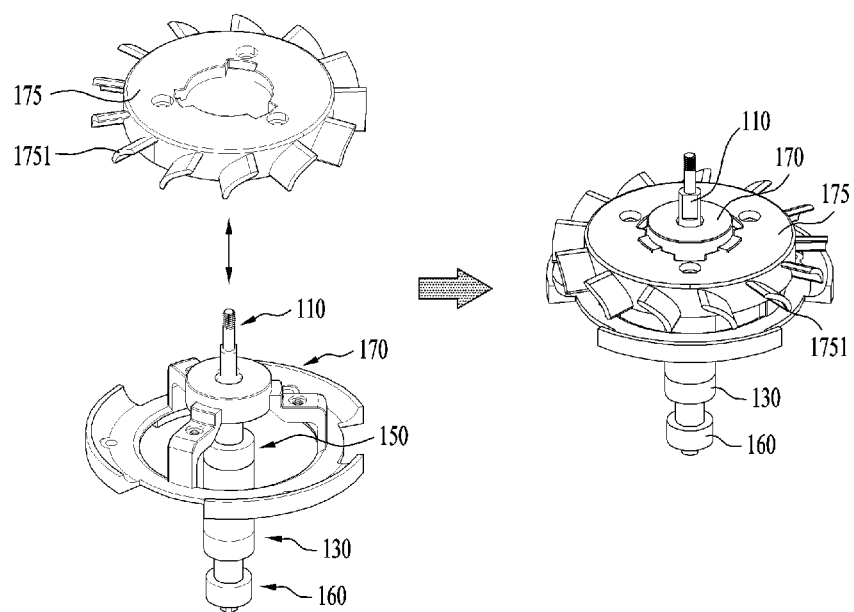
FIG. 9 is a perspective view illustrating a state in which a diffuser is installed in a first bearing housing in a state in which a first bearing, a second bearing, and a rotor are installed in the first bearing housing.
Figure 10:
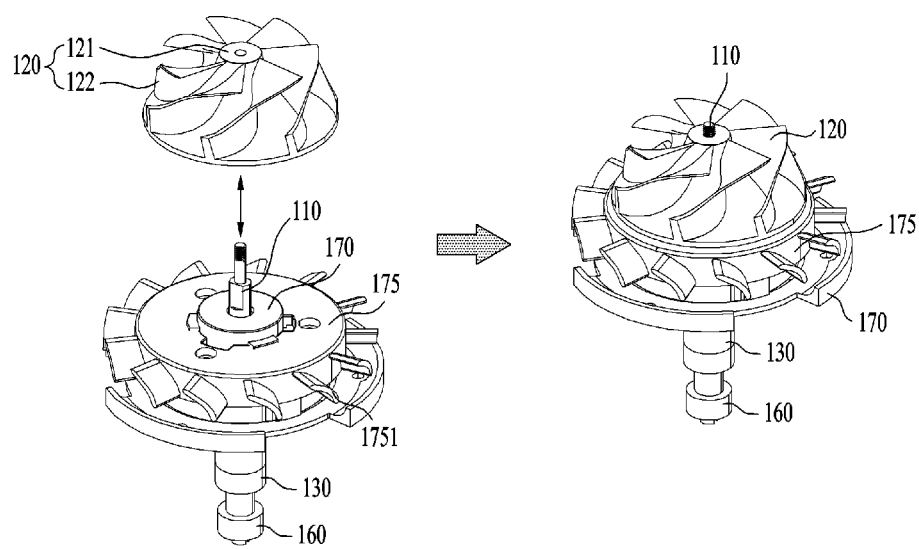
FIG. 10 is a perspective view illustrating a state in which an impeller is fastened to a rotation shaft in a state in which a first bearing, a second bearing, a rotor, and a diffuser are installed in the first bearing housing.
Figure 11:
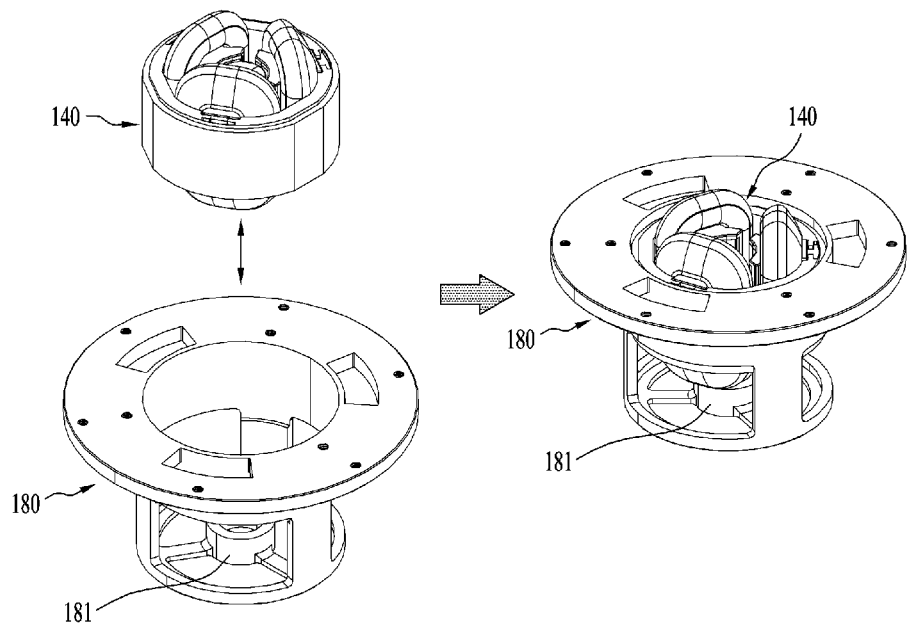
FIG. 11 is a perspective view illustrating a state in which a stator is coupled to a motor housing.
Figure 12:
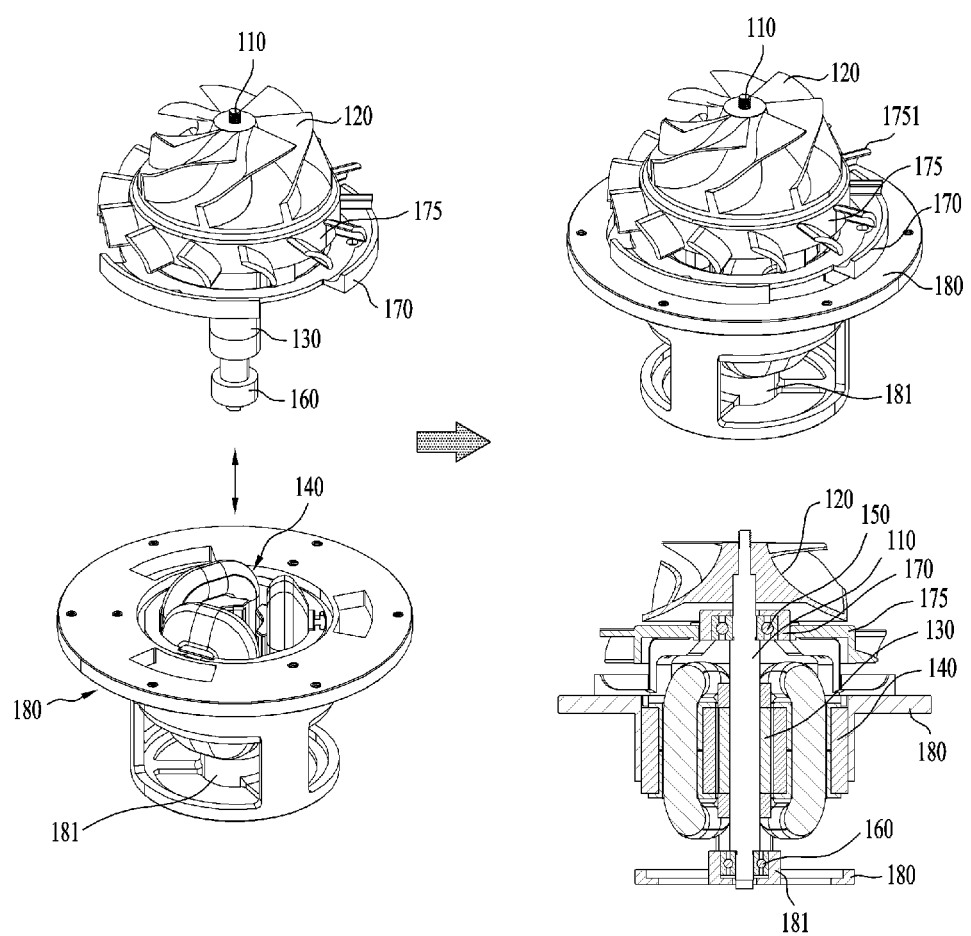
FIG. 12 is a perspective view and a cross-sectional view illustrating a state in which a first bearing housing and a motor housing are coupled to each other such that a second bearing penetrates an inner face of a stator to be accommodated in a second bearing housing of the motor housing.
Figure 13:
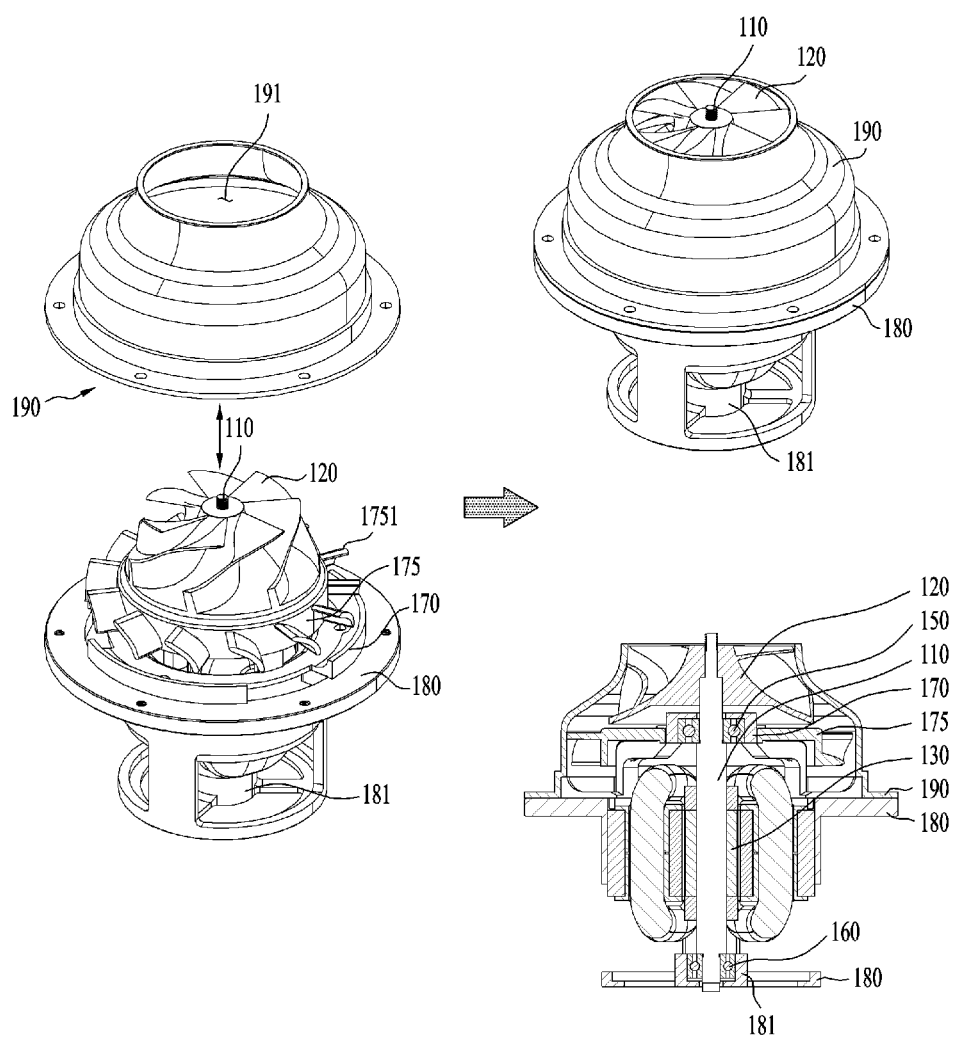
FIG. 13 is a perspective view and a cross-sectional view illustrating a state in which an inlet body accommodating an impeller, a first bearing housing, and a diffuser therein, and a motor housing accommodating a rotor, a stator, and a second bearing therein are fastened to each other.

FIG. 6 is a flowchart schematically illustrating a method for manufacturing the motor assembly shown in FIG. 1. Further, FIG. 7 is a perspective view illustrating a state in which a first bearing, a second bearing, and a rotor are installed on a rotation shaft. Further, FIG. 8 is a perspective view illustrating a state in which a rotation shaft on which a first bearing, a second bearing, and a rotor are installed is installed in a first bearing housing. Further, FIG. 9 is a perspective view illustrating a state in which a diffuser is installed in a first bearing housing in a state in which a first bearing, a second bearing, and a rotor are installed in the first bearing housing. Further, FIG. 10 is a perspective view illustrating a state in which an impeller is fastened to a rotation shaft in a state in which a first bearing, a second bearing, a rotor, and a diffuser are installed in the first bearing housing. Further, FIG. 11 is a perspective view illustrating a state in which a stator is coupled to a motor housing. Further, FIG. 12 is a perspective view and a cross-sectional view illustrating a state in which a first bearing housing and a motor housing are coupled to each other such that a second bearing penetrates an inner face of a stator to be accommodated in a second bearing housing of the motor housing. Further, FIG. 13 is a perspective view and a cross-sectional view illustrating a state in which an inlet body accommodating an impeller, a first bearing housing, and a diffuser therein, and a motor housing accommodating a rotor, a stator, and a second bearing therein are fastened to each other.

Referring first to FIGS. 6 and 7, the rotor 130 may be installed on the rotation shaft 110, and the first bearing 150 may be installed at the one side 110A of the rotation shaft 110 relative to the rotor 130, and the second bearing 160 may be installed at the other side 110B of the rotation shaft 110 relative to the rotor 130 (S601).

Specifically, the first bearing 150 may be seated on the first step 115 formed at the one side 110A of the rotation shaft 110 to surround the first bearing coupling portion 112, and the second bearing 160 may be seated on the second step 116 formed at the other side 110B of the rotation shaft 110 to surround the second bearing coupling portion 114. In this connection, the first bearing 150, the rotor 130, and the second bearing 160 may be sequentially arranged along the longitudinal direction of the rotation shaft 110. The outer diameter D1 (see FIG. 5) of the first bearing 150 may be larger than the outer diameter D2 (see FIG. 5) of the second bearing 160.

Next, referring to FIGS. 6 and 8, in a state in which the first bearing 150, the rotor 130, and the second bearing 160 are installed on the rotation shaft 110, the first bearing 150 may be seated in the first bearing housing 170 (S603).

In other words, the rotation shaft 110 on which the first bearing 150, the rotor 130, and the second bearing 160 are installed and the first bearing housing 170 are brought to be close to each other. First, the one side 110A of the rotation shaft 110 may move to the first through hole 171 of the first bearing housing 170 and pass through the first through hole 171. Thereafter, the first bearing 150 may be inserted into the empty space defined in the first bearing housing 170.

The first bearing 150 inserted into the first bearing housing 170 may be supported in the radial direction R and in the axial direction L of the rotation shaft 110 respectively by the first side support 172 and the first longitudinal support 173 of the first bearing housing 170.

Next, referring to FIGS. 6 and 9, after the first bearing 150 is seated in the first bearing housing 170 in a state in which the first bearing 150, the rotor 130, and the second bearing 160 are installed on the rotation shaft 110, the diffuser 175 may be installed in the first bearing housing 170 (S605).

However, an embodiment is not limited thereto. For example, it is also possible to fasten the first bearing housing 170 and the diffuser 175 with each other, and then mount the first bearing 150 in the first bearing housing 170 on which the diffuser 175 is fastened, before seating the first bearing 150 in the first bearing housing 170.

In other words, an order of the step of mounting the first bearing 150 in the first bearing housing 170 (S603) and the step of installing the diffuser 175 on the first bearing housing 170 (S605) may be reversed. That is, the step S605 of installing the diffuser 175 on the first bearing housing 170 may be performed first, and then the step S603 of mounting the first bearing 150 in the first bearing housing 170 may be performed.

Although not separately illustrated in the drawings, the first bearing housing 170 and the diffuser 175 may be fastened to each other by screwing. For example, the first bearing housing 170 and the diffuser 175 may respectively have screw coupling holes (not shown) overlapping each other, and the first bearing housing 170 and the diffuser 175 may be fastened to each other in a manner in which a screw is inserted into the screw coupling holes. However, embodiments are not limited thereto, and the first bearing housing 170 and the diffuser 175 may be fastened to each other in a different manner from the screwing. For example, the first bearing housing 170 and the diffuser 175 may have a protrusion and a groove, respectively. In a state in which the protrusion is inserted in the groove, the first bearing housing 170 and the diffuser 175 may be maintained in a fastened state.

Next, referring to FIGS. 6 and 10, the first bearing 150 is seated in the first bearing housing 170 in the state in which the first bearing 150, the rotor 130, and the second bearing 160 are installed on the rotation shaft 110. Further, after the diffuser 175 is installed in the first bearing housing 170, the impeller 120 may be press-fitted and fixed at the one side 110A of the rotation shaft 110 to be closer to the one end 110C of the rotation shaft 110 than the first bearing 150 with respect to the axial direction L of the rotation shaft 110 (S607).

Specifically, the impeller 120 may be fastened with the rotation shaft 110, and may rotate together with the rotation shaft 110 when the rotation shaft 110 rotates.

Next, referring to FIGS. 6 and 11, the stator 140 may be installed on the inner circumferential face of the motor housing 180 that is provided separately from the rotation shaft 110, the first bearing housing 170, the diffuser 175, and the impeller 120 (S609). The stator 140 may be inserted into the motor housing 180 at a side (that is, a lower side) opposite to a side (that is, an upper side) at which the rotation shaft 110, the first bearing 150, the rotor 130, and the second bearing 160 are inserted into the first bearing housing 170.

Specifically, the stator 140 may be fixed to the inner circumferential face of the motor housing 180. To this end, a step (not shown) for supporting and fixing the stator 140 may be formed on the inner circumferential face of the motor housing 180. As such, in a state in which the stator 140 is seated on the step formed on the inner circumferential face of the motor housing 180, as the first bearing housing 170 and the motor housing 180 are fastened with each other, the stator 140 may remain fixed so as not to move along the axial direction L of the rotation shaft 110 in the first bearing housing 170 and the motor housing 180.

Next, referring to FIGS. 6 and 12, the first bearing 150, the rotor 130, and the second bearing 160 are installed on the rotation shaft 110, and in such state, the first bearing 150 is seated in the first bearing housing 170. In addition, in a state in which the diffuser 175 is installed in the first bearing housing 170, and the impeller 120 is also installed on the rotation shaft 110, the first bearing housing 170 and the motor housing 180 may be fastened with each other such that the second bearing 160 penetrates the inner face (see FIG. 5) of the stator 140 and is accommodated in the second bearing housing 181 formed in the motor housing 180 (S611).

In this connection, the outer diameter D2 (see FIG. 5) of the second bearing 160 is smaller than the inner diameter 140*d* (see FIG. 5) of the stator 140 as described above, so that the second bearing 160 may approach the second bearing housing 181 through the inner face (see FIG. 5) of the stator 140.

In this connection, before the second bearing 160 is in contact with the detachment preventing portion 1813 of the second bearing housing 181, the first bearing housing 170 and the motor housing 180 may be in contact with each other. In this state, although not separately shown in the drawings, the first bearing housing 170 and the motor housing 180 may be fastened to each other through screwing.

As described above, although not shown in the drawing, the elastic member (not shown) such as the wave washer may be interposed in the empty space defined between the second bearing 160 and the detachment preventing portion 1813 to elastically support (preload) the second bearing 160 in the axial direction L of the rotation shaft 110. However, the elastic member may not be limited to the wave washer, but may be made of the material having the elasticity such as the general spring.

For example, the first bearing housing 170 and the motor housing 180 may respectively have screw coupling holes (not shown) overlapping each other, and the first bearing housing 170 and the motor housing 180 may be fastened to each other in a manner in which a screw is inserted into the screw coupling holes. However, embodiments are not limited thereto, and the first bearing housing 170 and the motor housing 180 may be fastened to each other in a different manner from the screwing. For example, the first bearing housing 170 and the motor housing 180 may have a protrusion and a groove, respectively. In a state in which the protrusion is inserted in the groove, the first bearing housing 170 and the motor housing 180 may be maintained in a fastened state.

According to the method for manufacturing the motor assembly 100 as described above, because the one side 110A and the other side 110B of the rotation shaft 110 may be respectively supported by the first bearing 150 and the second bearing 160, the rotation shaft 110 may be stably supported.

In addition, the first bearing 150 is seated in the first bearing housing 170, is supported in the radial direction R and in the axial direction L by the first side support 172 and the first longitudinal support 173, and has the outer diameter D1 larger than that of the second bearing 160, so that not only the one side 110A of the rotation shaft 110 may be supported in both the radial direction R and the axial direction L, but also the sufficient fatigue life for stably support the rotation shaft 110 may be secured.

Further, although the second bearing 160 has the outer diameter D2 smaller than that of the first bearing 150, the second bearing 160 supports the rotation shaft 110 in the radial direction R at the other side 110B of the rotation shaft 110 unlike the first bearing 150. Thus, the second bearing 160 may have the outer diameter D2 smaller than that of the first bearing 150, which supports the rotation shaft 110 in the radial direction R and in the axial direction L together, and thus, the weight lightening and the miniaturization of the motor assembly 100 may be achieved.

In addition, the fatigue life of the first bearing 150 may be secured by designing the first bearing 150 and the second bearing 160 to respectively support the one side 110A and the other side 110B of the rotation shaft 110, and designing the outer diameter D1 of the first bearing 150, which supports the thrust force of the rotation shaft 110, to be large. At the same time, the miniaturization and the weight lightening of the motor assembly 100 may be implemented by adopting a structure in which the second bearing 160 may have the outer diameter D2 smaller than the inner diameter 140*d* of the stator 140.

In addition, the second bearing 160 having the relatively small outer diameter D2 may penetrate the inner face of the stator 140 when the motor assembly 100 is assembled. Thus, in the assembly of the motor assembly 100, there is no need to install a separate bearing at the other side 110B of the rotation shaft 110 after the rotation shaft 110 passes through the inner face of the stator 140. Therefore, the assembly costs of the motor assembly 100 may be reduced.

Effects as not described herein may be derived from the above configurations. The relationship between the above-described components may allow a new effect not seen in the conventional approach to be derived.

In addition, embodiments shown in the drawings may be modified and implemented in other forms. The modifications should be regarded as falling within a scope of the present disclosure when the modifications is carried out so as to include a component claimed in the claims or within a scope of an equivalent thereto.

What is claimed is:

1. A motor assembly comprising:
   a housing;
   a rotation shaft;
   an impeller mounted on the rotation shaft;
   a rotor mounted on the rotation shaft and axially spaced apart from the impeller along a rotational axis of the rotation shaft;
   a stator surrounding an outer face of the rotor and radially spaced apart from the rotor;
   a first bearing mounted on the rotation shaft between the impeller and the rotor and configured to rotatably support the rotation shaft against the housing; and
   a second bearing mounted on the rotation shaft opposite to the first bearing with respect to the rotor and configured to rotatably support the rotation shaft against the housing,
   wherein an outer diameter of the first bearing is larger than an outer diameter of the second bearing, and
   wherein the outer diameter of the first bearing is larger than an inner diameter of the stator.

2. The motor assembly of claim 1, wherein the rotation shaft has a first portion configured to mount the first bearing and a second portion configured to mount the second bearing, the first portion having an outer diameter that is larger than an outer diameter of the second portion.

3. The motor assembly of claim 1, wherein the rotation shaft includes:
   a first portion supported by the first bearing radially and axially relative to the rotational axis of the rotation shaft, and
   a second portion supported by the second bearing radially relative to the rotational axis of the rotation shaft.

4. The motor assembly of claim 1, wherein the housing includes:
   a first bearing housing that receives the first bearing therein and includes:
      a first side support defining a first through hole through which the rotation shaft is received, wherein the first side support is configured to at least partially surround an outer circumferential surface of the first bearing and prevent a radial movement of the first bearing relative to the rotational axis of the rotation shaft; and
      a first longitudinal support configured to at least partially cover an axial surface of the first bearing and prevent an axial movement of the first bearing towards the impeller.

5. The motor assembly of claim 4, wherein the first bearing includes:
   a first inner ring fixed on an outer circumferential face of the rotation shaft;
   a first outer ring fixed to the first side support and the first longitudinal support of the first bearing housing; and
   a first rolling member interposed between the first inner ring and the first outer ring and configured to movably support the first inner ring relative to the first outer ring.

6. The motor assembly of claim 5, wherein the rotation shaft includes:
   an impeller coupling portion that mounts the impeller thereon;
   a first bearing coupling portion that mounts the first bearing thereon;
   a rotor coupling portion mounts the rotor thereon; and
   a second bearing coupling portion that mounts the second bearing thereon.

7. The motor assembly of claim 6, wherein an outer diameter of the first bearing coupling portion is smaller than an outer diameter of the rotor coupling portion, and
   wherein the rotation shaft includes a first radial contact face that radially extends and that contacts with the first bearing.

8. The motor assembly of claim 7, wherein the first inner ring of the first bearing is fixed to an outer circumferential face of the first bearing coupling portion and the first contact face of the rotation shaft such that the first inner ring rotates together with the rotation shaft when the rotation shaft rotates.

9. The motor assembly of claim 6, wherein the housing includes:
   a motor housing having an inner circumferential face that mounts the stator thereon and includes:
      a second side support defining a second through hole through which the rotation shaft is received, wherein the second side support is configured to at least partially surround the second bearing and prevent a radial movement of the second bearing relative to the rotational axis of the rotation shaft; and
      a detachment preventing portion configured to at least partially cover an axial surface of the second bearing, wherein the detachment preventing portion is axially spaced apart from the second bearing.

10. The motor assembly of claim 9, wherein the second bearing includes:
    a second inner ring fixed on the outer circumferential face of the rotation shaft;
    a second outer ring fixed to the second side support of the second bearing housing; and
    a second rolling member interposed between the second inner ring and the second outer ring and configured to movably support the second inner ring with respect to the second outer ring.

11. The motor assembly of claim 10, wherein an outer diameter of the second bearing coupling portion is smaller than an outer diameter of the rotor coupling portion; and
    wherein the rotation shaft includes a second radial contact face that radially extends and contacts with the second bearing.

12. The motor assembly of claim 1, wherein the rotation shaft includes a first step configured to axially seat the first bearing thereon and prevent an axial movement of the first bearing toward the rotor.

13. The motor assembly of claim 1, wherein the rotation shaft includes a second step configured to axially seat the second bearing thereon and prevent an axial movement of the second bearing toward the impeller.

14. The motor assembly of claim 1, wherein an inner diameter of the stator is larger than the outer diameter of the second bearing.

15. A method for manufacturing a motor assembly, the method comprising:

mounting a rotor on a rotation shaft;
mounting a first bearing on the rotation shaft;
mounting a second bearing on a rotation shaft;
seating the first bearing in a first bearing housing;
mounting a stator on an inner circumferential face of a motor housing;
inserting the second bearing through an inner face of the stator;
disposing the second bearing in a second bearing housing of the motor housing; and
fastening the first bearing housing with the motor housing,
wherein an outer diameter of the first bearing is larger than an outer diameter of the second bearing.

16. The method of claim 15, wherein the rotation shaft has a first portion configured to mount the first bearing and a second portion configured to mount the second bearing, the first portion having an outer diameter that is larger than an outer diameter of the second portion of the rotation shaft.

17. The method of claim 15, wherein the rotation shaft includes:

a first portion supported by the first bearing radially and axially relative to a rotational axis of the rotation shaft, and
a second portion supported by the second bearing radially relative to the rotational axis of the rotation shaft.

18. The method of claim 15, further comprising:
mounting a diffuser in the first bearing housing; and
mounting an impeller to a portion of the rotation shaft that is axially closer to an end of the rotation shaft than the first bearing.

19. The method of claim 18, further comprising:
fastening an inlet body with the motor housing, wherein the inlet body is configured to receive a first portion of the rotation shaft, the first bearing, the first bearing housing, the impeller, and the diffuser therein, the first portion of the rotation shaft configured to mount the first bearing, and wherein the motor housing is configured to receive a second portion of the rotation shaft, the second bearing, at least a portion of the rotor, and at least a portion of the stator therein, the second portion of the rotation shaft configured to mount the second bearing.

* * * * *